Jan. 28, 1969 R. E. MONNIER 3,424,867

OSCILLOSCOPE CIRCUITS

Filed May 3, 1965 Sheet 1 of 2

INVENTOR
RICHARD E. MONNIER
BY A. C. Smith
ATTORNEY

INVENTOR
RICHARD E. MONNIER
BY Q. C. Smith
ATTORNEY 3,424,867
OSCILLOSCOPE CIRCUITS Richard E. Monnier, Sunnyvale, Calif., assignor to Hewlett-Packard Company, Palo Alto, Calif., a corporation of California Filed May 3, 1965, Ser. No. 452,659
U.S. Cl. 178—69.5 2 Claims
Int. Cl. H04l 7/04

ABSTRACT OF THE DISCLOSURE

An oscilloscope circuit wherein the first transition in the synchronizing signal following the start of the vertical synchronizing interval initiates a signal pulse, said signal pulse combines with one of two outputs from a multivibrator either in polarity-aiding relationship when the wrong field is displayed and polarity-opposing relationship when the proper field is displayed. The amplitude of the combined signal when the two signals are in a polarity-aiding relationship exceeds a predetermined level initiating a shift in operation to provide a display of the proper field.

This invention relates to an oscilloscope circuit for displaying a selected recurring signal such as one of the two fields of a composite television signal.

It is an object of the present invention to provide an oscilloscope circuit which selects and displays a chosen one of two fields of a television composite signal.

It is another object of the present invention to provide an improved oscilloscope for use as a television signal monitor.

In accordance with the illustrated embodiment of the present invention, a monostable multivibrator having a delay time which is longer than one half the period and shorter than the whole period between adjacent horizontal synchronizing pulses that appear between alternate fields of a television synchronizing signal, is triggered by the leading edge of these horizontal synchronizing pulses. The first transition in the synchronizing signal which follows the start of the vertical synchronizing interval initiates a signal pulse which is then combined with one or the other of two outputs of the multivibrator. The signal pulse and a multivibrator output combine in polarity-aiding relationship if the wrong field is being displayed so that the combined signal exceeds a predetermined level and is capable of initiating a shift in operation to provide a display of the alternate field. The signal pulse and a multivibrator output combine in polarity opposition if the proper field is being displayed so that the combined signal does not exceed the predetermined level and hence does not initiate a change in the display.

Figure 1:
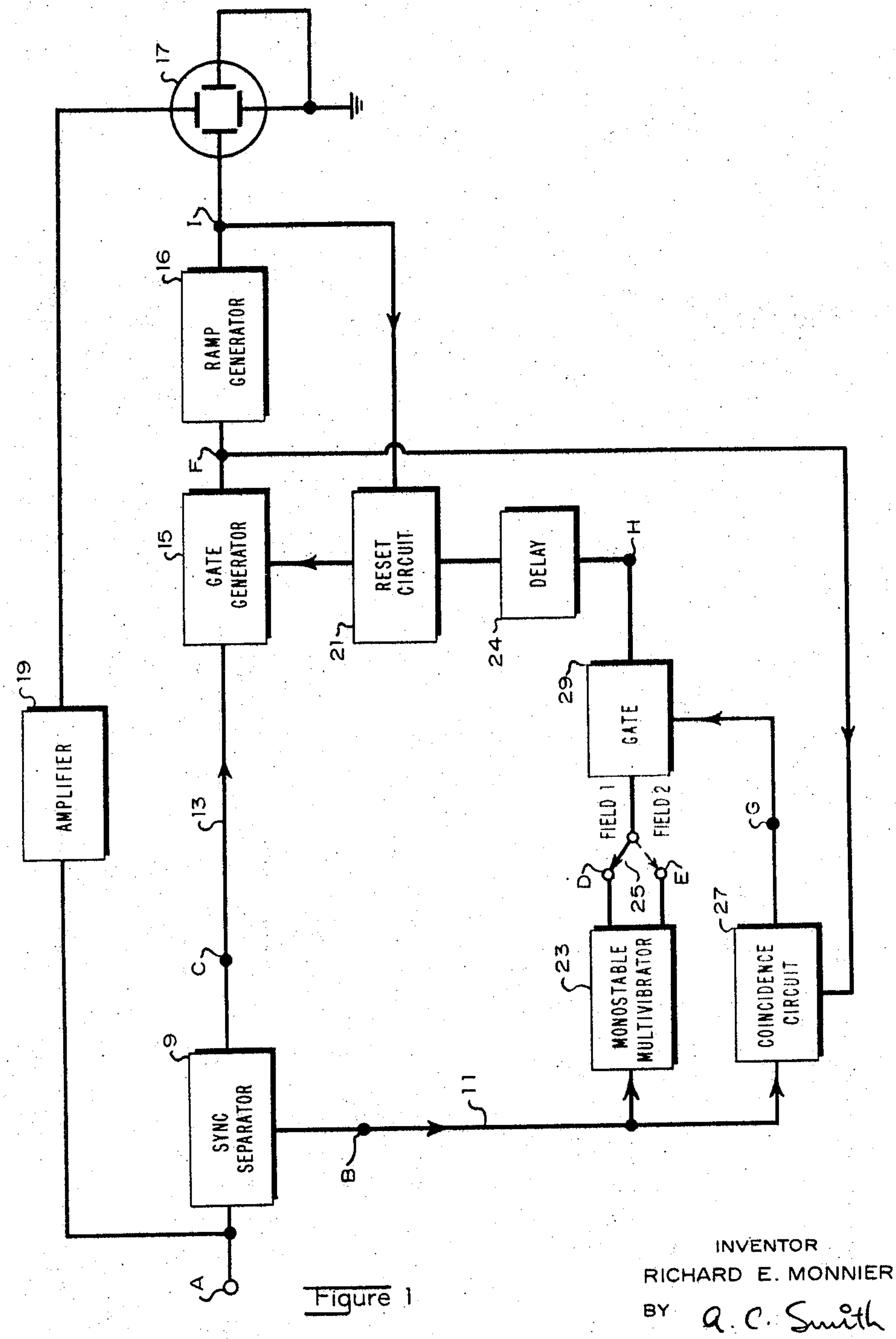
Figure 2:
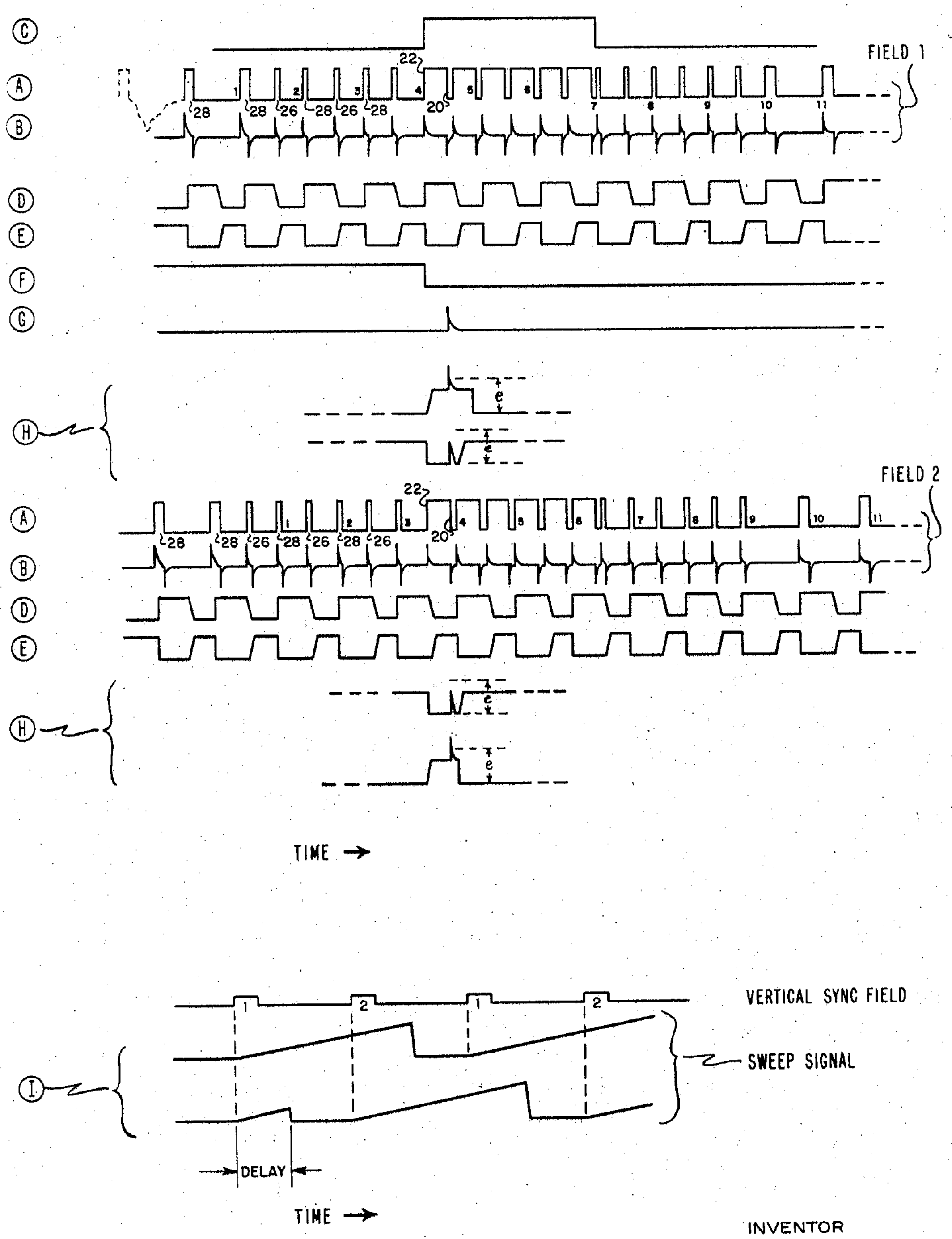

Other and incidental objects of the present invention will be apparent from a reading of this specification and an inspection of the accompanying drawing in which:

FIGURE 1 shows a block diagram of the field selection circuitry for an oscilloscope according to the present invention; and FIGURE 2 shows a graph of typical waveforms present at various points in the circuit of FIGURE 1.

Referring to FIGURE 1, there is shown a synchronizing pulse separator 9 which receives a composite television signal as shown in FIGURE 2A. The separator 9 produces horizontal synchronizing pulses, as shown in FIGURE 2B, on line 11 as differentiated pulses of the composite signal at A and produces vertical synchronizing pulses, as shown in FIGURE 2C, on line 13. The vertical synchronizing pulses on line 13 trigger the gate generator 15 which applies a signal (FIGURE 2F) to the ramp generator 16 which then produces a sweep signal, as shown in FIGURE 2I, having a duration that is normally longer than one field but less than two fields. This sweep signal is applied to the horizontal deflection system of cathode ray tube 17 and the composite video signal is applied to the vertical deflection system of cathode ray tube 17 through amplifier 19 to produce a display of a selected one of the two fields of the composite video signal. When the sweep signal attains a selected level *e* determined by the reset circuit 21, it disarms the gate generator 15 and actuates the ramp generator 16 to terminate the sweep signal.

The sweep signal may also be terminated prematurely in time and be retriggered to provide a display of the alternate one of the two fields as where the field selection switch 25 is set to the alternate position or where the circuit momentarily operates on the undesired field as a result of signal or power line transients. This is accomplished by coincidence circuit 27 which receives the differentiated horizontal synchronizing pulses on line 11 and the output of gate generator 15 to produce an output (FIGURE 2G) at the time of appearance of the first transition 20 following the start 22 of the vertical synchronizing interval. The desired multivibrator output selected by switch 25 and the output of coincidence circuit 27 (shown inverted) are combined in the gate circuit 29 in polarity-aiding relationship so that the combined amplitude exceeds the selected level *e* required to actuate reset circuit 21. This causes the gate generator 15 to reset and terminate the sweep in time to be retriggered on the next vertical synchronizing pulse that appears (i.e., in the alternate field). A delay circuit 24 may be included in the signal path that supplies the aforementioned combined signal to the reset circuit in order to delay the time at which the sweep signal is reset to a time after the termination of the vertical synchronizing interval to avoid erroneous retriggering of the sweep signal.

After this transition between the fields to be displayed, only the vertical synchronizing pulses in the desired field are capable of triggering the ramp generator to produce a sweep signal. This is because the sweep signal runs for a period longer than one field (i.e., from the start of the desired field past the start of the alternate field) and thus cannot be triggered by the vertical synchronizing pulse in the alternate field until reset just prior to appearance of the vertical synchronizing pulse in the desired field. It should be noted that the vertical synchronizing pulses in fields 1 and 2 are out of phase by one half cycle of the horizontal synchronizing pulses and that multivibrator 23 has a relaxation time which is longer than a half cycle of the horizontal synchronizing pulses. Thus, the multivibrator 23 responds only to the horizontal synchronizing pulses and not to the equalizing pulses 26 between horizontal synchronizing pulses 28. A given output of multivibrator 23 representing a given one of the two fields will always combine in polarity opposition with the signal from coincidence circuit 27 that is produced at the time of appearance of the first transition 20 after the start 22 of the vertical synchronizing interval when the desired field is being displayed. The amplitude of these two signals so combined does not attain the selected level *e* required to actuate reset circuit 21 so that the present circuit continues to display the desired field. If operation of the present circuit is momentarily interrupted for some reason, such as by power line or signal transmission transients or the like, then the undesired or alternate field may be displayed only long enough for the sweep to be terminated, as discussed above, and be reset for triggering on the desired field at its next successive recurrence. The present invention thus eliminates uncertainty about which one of the two television composite signals or fields is being displayed.

I claim:

1. Signalling apparatus for displaying a recurrent composite signal having vertical and horizontal synchronizing signal components, the apparatus comprising:

a synchronizing signal component separator connected to receive the composite signal for producing the vertical and horizontal synchronizing signal components on separate conductors;

means connected to receive the horizontal synchronizing signal component for producing an output at a time related to the appearance of a selected horizontal synchronizing signal during the interval of a vertical synchronizing signal;

signal means responsive to selected ones of the horizontal synchronizing signals for producing a pair of output signals of relatively opposite polarity; and sweep signal generating means for initiating a sweep signal at a time during the interval of a vertical synchronizing signal and for terminating the sweep signal in response either to the sweep signal or the combination of said output and one of the pair of output signals attaining a selected amplitude.

2. Signalling apparatus for displaying a selected field of a recurrent television composite signal having vertical and horizontal synchronizing signal components, the apparatus comprising:

a synchronizing signal component separator connected to receive the composite signal for producing the vertical and horizontal synchronizing signal components on separate conductors;

a gate generator responsive to a vertical synchronizing signal for initiating a sweep control signal;

a monostable multivibrator having a timing period when triggered which is shorter than one horizontal synchronizing signal period but longer than one half such period, the multivibrator being connected to receive the horizontal synchronizing pulses for producing a pair of outputs of relatively high and low amplitude which vary in opposite phase relationship;

means responsive to the sweep control signal and to the horizontal synchronizing signals for producing an output control signal at a time related to the appearance of a horizontal synchronizing signal following the appearance of the sweep control signal;

a sweep signal generator for producing a sweep signal for the period of said sweep control signal; and means connecting said gate generator to receive the sweep signal and the combination of the output control signal and a selected one of the multivibrator outputs for terminating said sweep control signal in response either to the sweep signal or the combination of said output control signal and a selected one of said multivibrator outputs attaining a selected amplitude.

References Cited

UNITED STATES PATENTS

| | | | |
|---|---|---|---|
| 2,615,979 | 10/1952 | Abbenhouse | 178—7.5 |
| 2,802,046 | 8/1957 | Keen | 178—7.5 |
| 2,885,470 | 5/1959 | Bartelink | 178—6 |

ROBERT L. GRIFFIN, *Primary Examiner.*

JOSEPH A. ORSINO, Jr., *Assistant Examiner.*

U.S. Cl. X.R.

178—7.5; 324—88; 328—187